United States Patent [19]

Hashimoto

[11] 4,445,000

[45] Apr. 24, 1984

[54] AUTOMATIC TELEPHONE ANSWERING APPARATUS

[75] Inventor: Kazuo Hashimoto, Tokyo, Japan

[73] Assignee: Hashimoto Corporation, Tokyo, Japan

[21] Appl. No.: 336,434

[22] Filed: Dec. 31, 1981

[30] Foreign Application Priority Data

Jan. 12, 1981 [JP] Japan .................................. 56-2906

[51] Int. Cl.³ ...................... H04M 1/64; G11B 15/18
[52] U.S. Cl. ..................................... 179/6.03; 360/91
[58] Field of Search ..................... 179/6.03, 6.07, 6.10, 179/6.20, 6.13; 360/93, 96.1, 96.3, 96.4, 96.5, 91, 92

[56] References Cited

U.S. PATENT DOCUMENTS

| 3,959,591 | 5/1976 | Darwood | 179/6.13 |
| 3,968,329 | 7/1976 | Darwood | 179/6.03 |
| 4,385,205 | 5/1983 | Jacobson | 179/6.03 |

*Primary Examiner*—Donald E. McElheny, Jr.
*Attorney, Agent, or Firm*—Lowe, King, Price & Becker

[57] ABSTRACT

An automatic telephone answering apparatus includes an outgoing message tape drive mechanism; an outgoing message tape switching mechanism; an incoming message tape drive mechanism; an incoming message tape switching mechanism; and an escape mechanism. The escape mechanism includes a pivotal plate coupled to an outgoing message tape slide plate. A cam is formed at a front end of the pivoted plate. A pivotal support plate engages with the cam and supports an idler interposed between a driving roller and a rewinding roller. The escape mechanism operates mechanically in cooperation with operation of the outgoing message tape switching mechanism to prevent transmission of rotational force from a motor to the rewinding roller so the incoming message tape may not be rewound during operation of the outgoing message tape switching mechanism.

6 Claims, 1 Drawing Figure

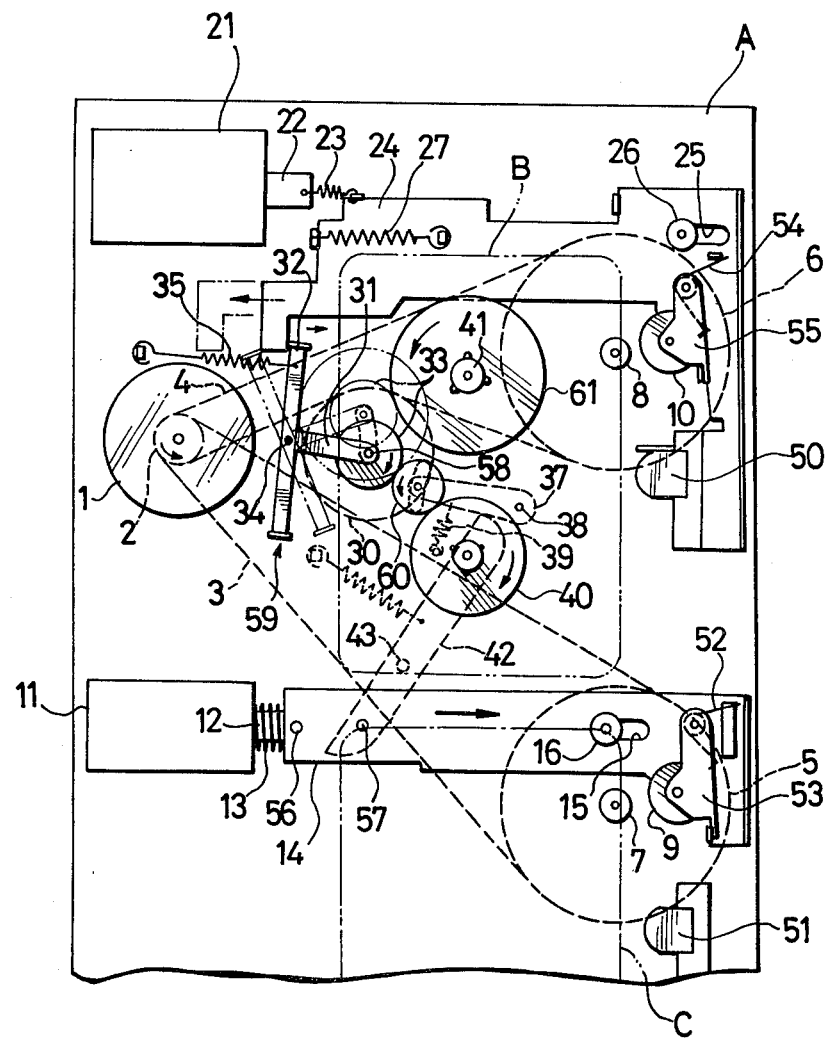

AUTOMATIC TELEPHONE ANSWERING APPARATUS

BACKGROUND OF THE INVENTION

The present invention relates to an automatic telephone answering apparatus and, more particularly, to an improvement in a tape drive mechanism therefor. A conventional telephone answering apparatus generally has an outgoing message tape (endless tape) and an incoming message tape (general take-up type cassette tape), and operates by alternately driving these tapes.

A conventional telephone answering apparatus of the aforesaid type uses two general cassette tape deck mechanisms and a common motor, so that the rotation of motor may not be transmitted to a take-up spindle of the incoming message tape during the driving period of the outgoing message tape. Examples of conventional telephone answering apparatus are disclosed in U.S. Pat. No. 3,959,591 wherein an idler interposed between the common motor and the take-up roller for the incoming message tape is displaced by a particular plunger coil; or as described in British Pat. No. 1,453,948 wherein two pulleys acting in opposite directions are mounted on the shaft of the common motor through a unidirectional rotary clutch, and a belt is mounted on these pulleys, the outgoing message tape drive flywheel, and the incoming message tape drive flywheel.

However, the former apparatus uses a particular plunger coil, so extra wiring is necessary. Therefore, the apparatus becomes complex in structure and expensive to manufacture. On the other hand, with the latter apparatus, the unidirectional rotary clutch is easy to break. Therefore, the operation of the apparatus is less reliable and the apparatus requires a mechanism for reversing the direction of rotation of the motor.

SUMMARY OF THE INVENTION

It is an object of the present invention to provide an automatic telephone answering apparatus which has a common motor for two tape drive mechanisms, one switching mechanism for driving the outgoing message tape, and another switching mechanism for driving the incoming message tape, wherein the escape operation is performed purely mechanically in cooperation with the operation of the outgoing message tape switching mechanism without involving an electrical mechanism, so that rewinding of the incoming message tape may not be performed during the driving period of the incoming message tape. The cost of the apparatus is thus reduced and operation is reliable.

In order to achieve the above object, there is provided an automatic telephone answering apparatus including an outgoing message tape drive mechanism for transmitting a prerecorded outgoing message. The mechanism includes an outgoing message tape belt mounted on a motor pulley of a common motor, an outgoing message tape drive flywheel with an outgoing message tape capstan mounted thereon, and an outgoing message tape pinch roller pressed against the outgoing message tape capstan. An outgoing message tape switching mechanism for switching between operative and inoperative conditions of the outgoing message tape drive mechanism is provided, which includes an outgoing message tape plunger coil, and an outgoing message tape slide plate which is coupled to an outgoing message tape plunger pulled to the outgoing message tape plunger coil and which has the outgoing message tape pinch roller. An incoming message tape drive mechanism records an incoming message of a calling party, and includes a playback mechanism and a rewinding mechanism. The playback mechanism has an incoming message tape belt mounted to a motor pulley of the common motor and an incoming message tape drive flywheel with an incoming message tape capstan mounted thereon. An incoming message tape pinch roller is pressed against the incoming message tape capstan. A drive pulley is provided to which rotational force is transmitted through the incoming message tape belt. A roller supported by a shaft which also supports the drive pulley cooperate with a take-up roller. The rewinding mechanism includes a rewinding roller cooperating with the roller through an idler. An incoming message tape switching mechanism for switching between playback and rewinding operations includes an incoming message tape slide plate coupled to an incoming message tape plunger pulled to the incoming message tape plunger coil and which has the incoming message tape pinch roller. A support plate which engages with said incoming message tape slide plate and supports a shaft of a roller and the drive pulley for switching between transmission with a take-up pulley and transmission with a rewinding roller. An escape mechanism includes a pivotal plate coupled to the outgoing message tape. A cam is provided at a front end of the pivotal plate. A pivotal support plate engages with the cam and supports an idler interposed between the roller and the winding pulley. The escape mechanism operates mechanically in cooperation with the operation of the outgoing message tape switching mechanism to stop transmission of rotational force from the common motor to the rewinding roller so that the incoming message tape can not be rewound during an operative period of the outgoing message tape switching mechanism.

BRIEF DESCRIPTION OF THE DRAWINGS

The drawing is a plan view of the main part of an embodiment of the present invention.

DETAILED DESCRIPTION OF THE INVENTION

An incoming message tape cassette B and an outgoing message tape cassette C are mounted on a tape deck A. Outgoing message tape cassette C has the same outer shape as tape cassette B but houses an endless tape therein. A motor 1 has a motor pulley 2 to which is mounted an outgoing message tape belt 3 and an incoming message tape belt 4. Belt 3 extends over an outgoing message tape drive flywheel 5, while belt 4 extends over an incoming message tape drive flywheel 5. To flywheel 5 is mounted an outgoing message tape drive capstan 7 which functions as a central shaft. To flywheel 6 is mounted an incoming message tape capstan 8 which also functions as a central shaft. A bracket 53 is pivotally mounted to an outgoing message tape slide plate 14 and is pressed by a spring 52 against outgoing message tape capstan 7. Bracket 53 supports an outgoing message tape pinch roller 9. A bracket 55 is pivotally mounted to an incoming message tape slide plate 24 and is pressed by a spring 54 against incoming message tape capstan 8. Bracket 55 supports an incoming message tape pinch roller 10.

On tape deck A are mounted an outgoing message tape plunger coil 11 which displaces a mechanism for pressing against the outgoing message tape capstan 9 the outgoing message tape pinch roller 7 for driving the tape of the outgoing message tape cassette C. Coil 11 has an outgoing message tape plunger 12 which is pulled toward the coil during the operation thereof. Outgoing message tape slide plate 14 is provided at the front end of plunger 12 and coupled thereto by pins 56 and 57 and biased by a spring 13. Slide plate 14 has an elongated circular hole 15. A pin 16 for limiting the range of sliding movement of slide plate 14 is mounted on tape deck A. Bracket 53 for supporting the outgoing message tape pinch roller 9 is supported at one point at the front end of slide plate 14. A record/playback head 51 for the outgoing message tape to be described later is arranged in front of slide plate 14. An incoming message tape plunger coil 21 for actuating the incoming message tape drive mechanism is arranged on tape deck A. An incoming message tape plunger 22 to which is mounted one end of a spring 23 is arranged inside plunger coil 24. The other end of spring 23 is coupled to transversely moving slide plate 24. Slide plate 24 also has an elongated circular hole 25. A pin 26 for limiting the range of movement of slide plate 24 is arranged on deck A. A spring 27 is mounted on slide plate 24 to control movement thereof. A record/playback head 52 is fixed to slide plate 24.

A drive pulley 30 to which rotational force is transmitted from motor pulley 2 through belt 4 is arranged on tape deck A. Drive pulley 30 is supported by a shaft 58 which also supports a roller 33. Shaft 58 is supported by a T-shaped support plate 59 having shaft support plates 31 and 32. Support plate 59 is supported on tape deck A by a central shaft 34. T-shaped support plate 59 is biased counterclockwise by a spring 35 and engages with a front end of incoming message tape slide plate 24 which is operated by incoming message tape plunger coil 21. When the front end pulls shaft support plate 32 of T-shaped support plate 24 in the direction indicated by the arrow, roller 33 is separated from an incoming message tape take-up roller 61 to contact with an idler 60 which is, in turn, in contact with a rewinding roller 40. However, when the front end is displaced to the position indicated by phantom lines, i.e., when plunger 21 acts to move incoming message tape slide plate 24 to the left, roller 33 is brought into position to contact take-up roller 61 by spring 35, as indicated in phantom. In this case, since pulley 30 pivots counterclockwise about shaft 34, roller 33 which is concentric therewith also pivots counterclockwise as indicated in phantom. Then, roller 33 contacts take-up roller 61 which is concentric with an incoming message tape take-up spindle 41 to be described later, so that rotational force is transmitted to the take-up roller which then rotates in the direction indicated by the arrow.

When incoming message tape plunger coil 21 stops, incoming message tape slide plate 24 is brought to the position indicated by solid lines by spring 27. Next, incoming message tape pinch roller 10 is separated from incoming message tape capstan 8, and record/playback head 50 for the incoming message tape is also separated from the incoming message tape. Roller 33 moves to the solid line position, so that the rotational force of the roller is transmitted to rewinding roller 40 through idler 60 to rotate the rewinding roller in the rewinding direction. In this manner, the incoming message tape is rewound.

In the aforesaid incoming message tape drive mechanism, if motor 1 alone is energized, incoming message tape slide plate 24 is at the position indicated by solid lines. Therefore, roller 33 which is concentric with drive pulley 30 transmits rotational force to rewinding roller 40 through idler 60 to rewind the tape. On the other hand, when the incoming message tape is driven in the forward direction, incoming message tape plunger 21 acts to bring incoming message tape slide plate 24 to the phantom line position. Therefore, roller 33 moves to the phantom position. In this case, as described above, rotational force is transmitted to take-up roller 61 which is concentric with take-up spindle 41 to take up the tape at normal speed. Describing the drive mechanism of the outgoing message tape, when outgoing message tape plunger coil 11 is energized, outgoing message tape slide plate 41 is pulled toward coil 11. Outgoing message tape pinch roller 9 is then pressed against outgoing message tape capstan 7 to drive the outgoing message tape. As is well known, since an endless tape is used, the tape can be driven by contact between the pinch roller and the capstan even if the take-up reel and the supply reel are not incorporated. One problem with this is as follows. When outgoing message tape plunger coil 11 is energized to drive the outgoing message tape, motor 1 is rotating. Therefore, rotation of motor 1 is transmitted not only to outgoing message tape drive flywheel 5 but also to incoming message tape drive flywheel 6. That is, drive pulley 30 is driven since it is in contact with belt 4. Since drive pulley 30 is at the position indicated by solid lines in this instance, rotation thereof is transmitted to rewinding roller 40 so that the incoming message tape may be rewound while the outgoing message tape is driven. If this occurs, incorporation of the separate drive mechanisms for the incoming and outgoing message tapes becomes meaningless. In order to prevent such erroneous operation, another plunger is incorporated to disengage the idler from the take-up roller while outgoing message tape 7 is driven. However, this requires another plunger.

The embodiment according to the present invention has a support shaft 38 of a support plate 37 which supports idler 60, and a spring 39 which rotates support plate 37 counterclockwise. By these members, idler 60 is pressed against rewinding roller 40 and disengaged from the rewinding roller by clockwise pivot of support plate 37 by a pivot plate 42 which functions as a cam. More specifically, pivot plate 42 is supported by a shaft 43. The lower end of pivot plate 42 is coupled by a pin 57 to outgoing message tape slide plate 14 which is operated by outgoing message tape plunger coil 11. When the slide plate 14 moves in the direction indicated by the arrow, the pivot plate 42 slightly pivots counterclockwise about shaft 43. A circular cam is formed at the front end of pivot plate 42 and engages with support plate 37. When pivot plate 42 transversely pivots about shaft 43, the pivot plate presses slightly upward against the underside of support plate 37 supporting idler 60 so as to disengage the idler from rewinding roller 40 against the biasing force of spring 39. Pivot plate 42 has a notch to prevent engagement with the central shaft of rewinding roller 40.

In an automatic telephone answering apparatus, an announcement (outgoing message) is generally recorded in the manual record/playback mode on the outgoing message tape for monitoring. In this case, the incoming message tape is not in operation. When the subscriber returns home to listen to the recorded content of the calling party on the incoming message tape, incoming message tape plunger 21 and motor 1 alone are actuated. Roller 33 is then pressed against take-up roller 61 which is concentric with the take-up reel to drive the tape in the forward direction. In this case, the outgoing message tape must not be driven. When a telephone call is received, the outgoing message tape is driven. While the outgoing message tape is driven, the incoming message tape is not driven. When the terminal end of the outgoing message tape is detected, operation of outgoing message tape plunger 11 is interrupted and incoming message tape plunger 21 is energized, so that the incoming message tape is now driven. If the incoming message tape runs even slightly while the outgoing message tape is driven, it is not desirable. Similarly, the outgoing message tape must not run while the incoming message tape is driven.

According to the embodiment of the present invention, when outgoing message tape plunger 11 moves, pivot plate 42 always pivots counterclockwise to disengage (escape) idler 60 from rewinding roller 40 while the outgoing message tape is driven. Therefore, even if the rotational force is transmitted from common motor 1 to pulley 33 through belt 4, the incoming message tape is not affected.

If fast forward is desired during the forward drive of the incoming message tape, the capstan is disengaged from the pinch roller in the normal playback operation by the manual lever.

In the description presented above, the recording part, that is, the head, and the amplifying part are not described. However, it is to be understood that they are of conventional arrangement.

What is claimed is:

1. An automatic telephone answering apparatus having an outgoing message tape drive mechanism; an outgoing message tape switching mechanism for switching between operative and inoperative conditions of said outgoing message tape drive mechanism; an incoming message tape drive mechanism having a playback mechanism and a rewinding mechanism; an incoming message tape switching mechanism for switching said incoming message tape drive mechanism between the playback and rewinding operations; a single common motor driving said outgoing message tape drive mechanism and said incoming message tape drive mechanism; and an inhibiting mechanism for inhibiting the rewinding operation of an incoming message tape while said outgoing message tape drive mechanism is in operation, wherein said inhibiting mechanism has an escape mechanism interrupting transmission of rotational power from said common motor to said incoming message tape drive mechanism in mechanical cooperation with the operation of said outgoing message tape switching mechanism.

2. An apparatus according to claim 1, wherein said outgoing message tape drive mechanism includes an outgoing message tape belt mounted to a motor pulley of said common motor and an outgoing message tape drive flywheel with an outgoing message tape capstan mounted thereon, and an outgoing message tape pinch roller which is pressed against said outgoing message tape capstan.

3. An apparatus according to claim 1, wherein said outgoing message tape switching mechanism includes an outgoing message tape slide plate coupled to an outgoing message tape plunger pulled to an outgoing message tape plunger coil connected to an outgoing message tape pinch roller.

4. An apparatus according to claim 1, wherein said incoming message tape drive mechanism includes a playback mechanism and a rewinding mechanism, said playback mechanism having an incoming message tape belt mounted to a motor pulley of said common motor and an incoming message tape drive flywheel with an incoming message tape capstan mounted thereon, an incoming message tape pinch roller pressed against said incoming message tape capstan, a drive pulley to which rotational power is transmitted through said incoming message tape belt, a roller supported by a shaft which also supports said drive pulley, and a take-up roller operative in cooperation with said roller, said rewinding mechanism including a rewinding roller operative in cooperation with said roller through an idler.

5. An apparatus according to claim 1, wherein said incoming message tape switching mechanism includes an incoming message tape slide plate coupled to an incoming message tape plunger pulled to an incoming message tape plunger coil connected to an incoming message tape pinch roller, and a support plate which engages with said incoming message tape slide plate and which supports a shaft of a roller and said drive pulley for switching between transmission of rotational power from said roller to a take-up pulley and transmission of rotational power from said roller to a rewinding roller.

6. An apparatus according to claim 1, wherein said outgoing message tape switching mechanism includes an outgoing message tape slide plate coupled to an outgoing message tape plunger pulled to an outgoing message tape plunger coil; said incoming message tape switching mechanism including an incoming message tape slide plate coupled to an incoming message tape plunger pulled to an incoming message tape plunger coil connected to an incoming message tape pinch roller, and a support plate which engages with said incoming message tape slide plate and which supports a shaft of a roller and said drive pulley for switching between transmission of rotational power from said roller to a take-up pulley and transmission of rotational power from said roller to a rewinding roller; and said escape mechanism includes a pivotal plate which is coupled to said outgoing message tape slide plate and which has a cam at a front end thereof, and a pivotal support plate which engages with said pivot plate and which supports an idler interposed between said roller and said take-up pulley.

* * * * *